C. A. PARSONS AND S. S. COOK.
BEARING.
APPLICATION FILED FEB. 15, 1922.

1,438,054.

Patented Dec. 5, 1922.
7 SHEETS—SHEET 1.

INVENTORS:
CHARLES A. PARSONS,
STANLEY S. COOK.
By Spear, Middleton, Donaldson Hall.
Attys INVENTORS:
CHARLES A. PARSONS,
STANLEY S. COOK,
by Spear, Middleton, Donaldson & Hall.
Attys.

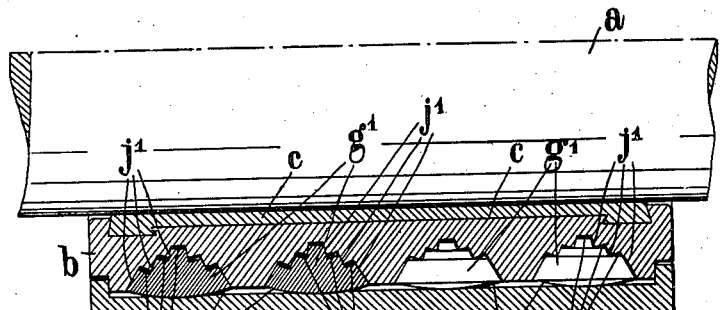
Fig.4.ᵃ
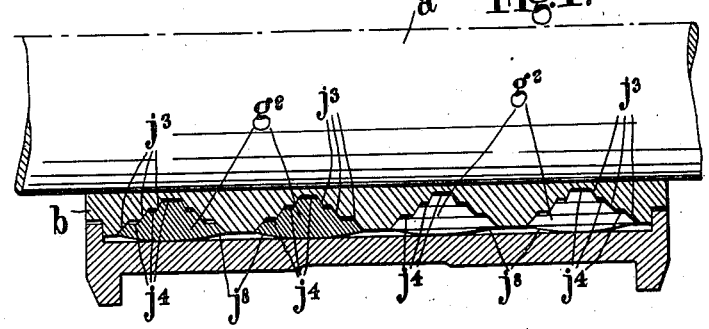
Fig.4.ᵇ
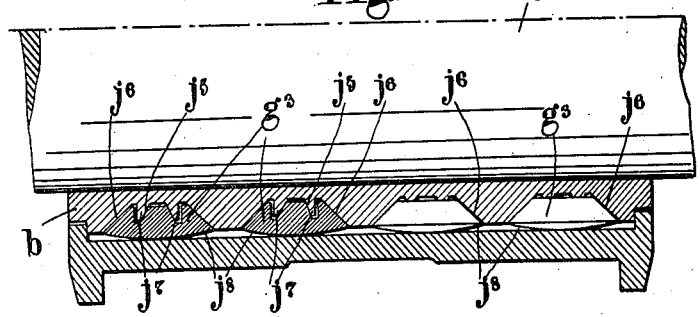
Fig.4.ᶜ

INVENTORS:
CHARLES A. PARSONS,
STANLEY S. COOK.

by Spear, Middleton, Donaldson & Hall.
Attys.

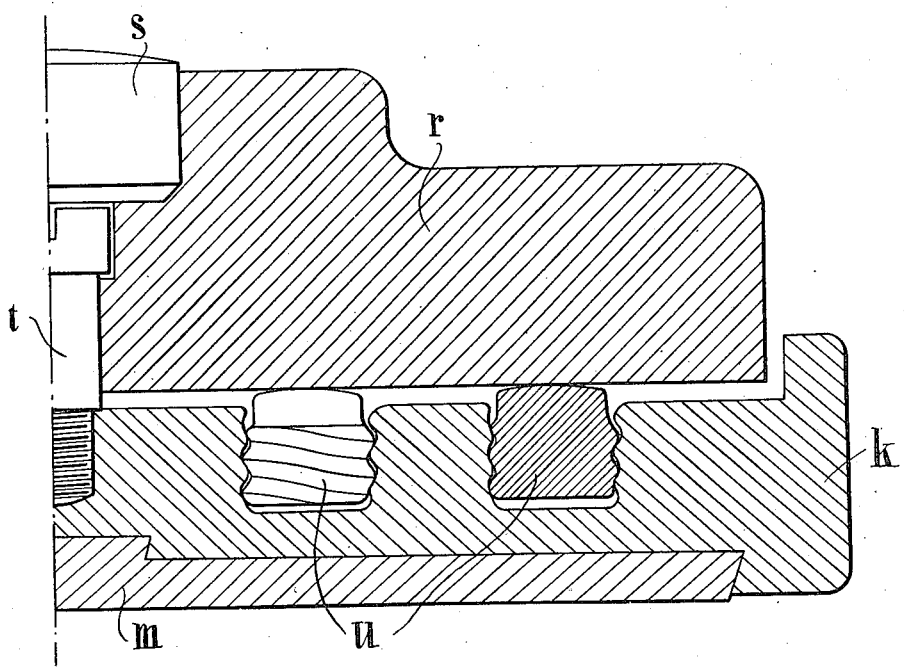

C. A. PARSONS AND S. S. COOK.
BEARING.
APPLICATION FILED FEB. 15, 1922.
1,438,054.
Patented Dec. 5, 1922.
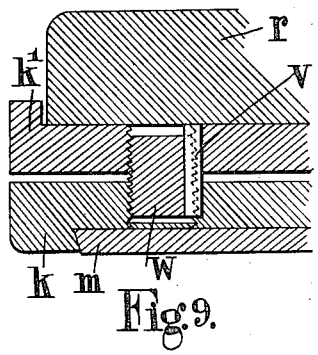
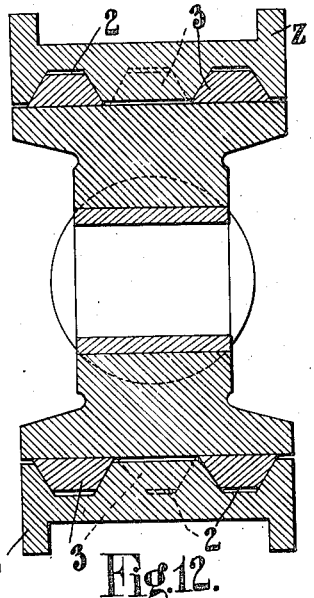
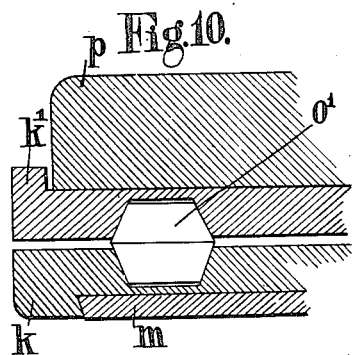
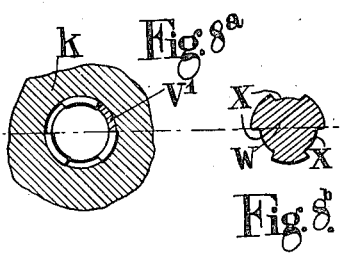
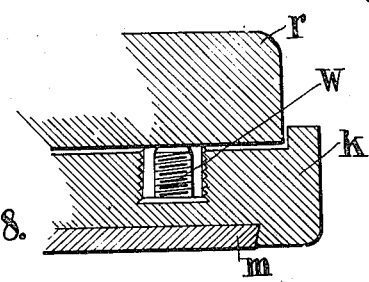
INVENTORS:
CHARLES A. PARSONS,
STANLEY S. COOK.
by Spear, Middleton, Donaldson & Hall.
Attys.

C. A. PARSONS AND S. S. COOK.
BEARING.
APPLICATION FILED FEB. 15, 1922.

1,438,054.

Patented Dec. 5, 1922.
7 SHEETS—SHEET 7.

INVENTORS:
CHARLES A. PARSONS,
STANLEY S. COOK by Spear, Middleton, Donaldson & Hall.
Attys.

Patented Dec. 5, 1922.

1,438,054

UNITED STATES PATENT OFFICE.

CHARLES ALGERNON PARSONS AND STANLEY SMITH COOK, OF NEWCASTLE-UPON-TYNE, ENGLAND; SAID COOK ASSIGNOR TO SAID PARSONS.

BEARING.

Application filed February 15, 1922. Serial No. 536,812.

*To all whom it may concern:*

Be it known that we, CHARLES ALGERNON PARSONS, and STANLEY SMITH COOK, both subjects of the King of Great Britain and Ireland, and both residing at Heaton Works, Newcastle-upon-Tyne, in the county of Northumberland, England, have invented certain new and useful Improvements in and Relating to Bearings, of which the following is a specification.

This invention relates to bearings of any type in which surfaces in relative motion are separated by a film of lubricant and carry load.

In all such bearings, the distribution of load over the surfaces is essentially unstable if the supports and backing of the surfaces are comparatively rigid and if the surfaces are accurately fitted together initially.

Any such slight local inequality of pressure as in practice it is impossible to avoid will generate more or less local frictional heat and cause an increased local rise or fall relatively to the surface as a whole, and thus augment the original inequality; moreover, this process will tend to continue especially at high surface speeds, until the lubricant is squeezed out and the surfaces seize.

In practice the action described is limited by the elasticity of the backing, the partial give or melting of the surface, if of white metal, and the thermal conductivity of the backing which tends to distribute the heat in the direction of the plane of the surface or in the direction of the tangent plane (if the surfaces are curved), while the relative motion of the surfaces helps to distribute the heat longitudinally in the direction of motion.

We are aware that many devices have been suggested to secure more even distribution of load by dividing up the surfaces into sections supported on compensating levers, steel balls in contact and other equivalent devices.

The object of the present invention is to secure automatically an approximate equal distribution of pressure in spite of small initial inaccuracies in a simple and effective manner.

The invention is based on the principle that if the surfaces of two plates or other elements having different coefficients of expansion or being or maintained at different temperatures are suitably figured to each other with complementary contours, these contours may be so designed as to allow the plates or the like to come closer together as the temperature rises, and vice versa.

Referring to the accompanying drawings illustrating different forms of the invention:—

Figure 3:
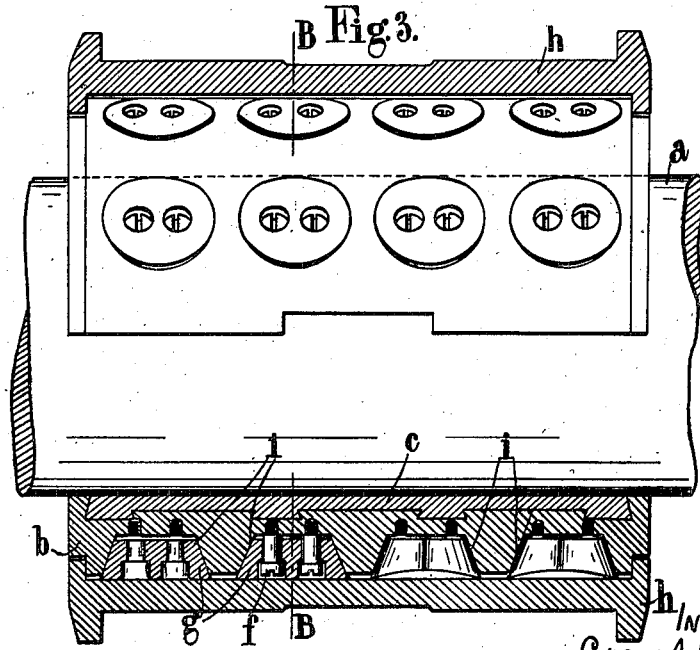
Figure 3 is a view similar to that of Figure 1 showing the application to a cylindrical bearing of compensating conical plugs.
Figure 4:
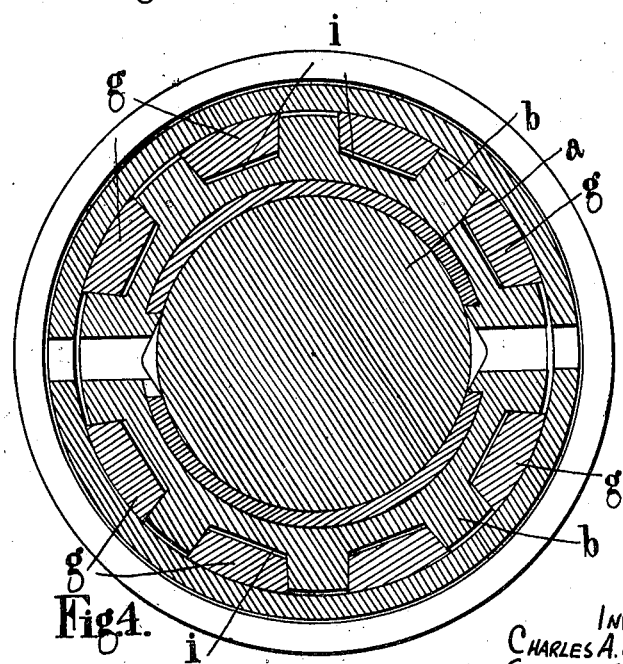
Figure 4 is a cross-section taken on the line B—B of Figure 3.

Figures 4$^a$, 4$^b$, 4$^c$ are views similar to the lower half of Figure 3 showing modified forms of conical plug.

Figure 5:
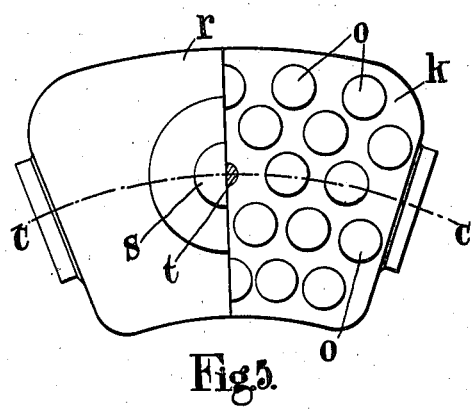
Figure 6:
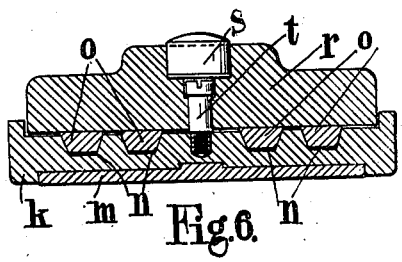

Figure 5 shows the application of a number of compensating conical plugs to a pivoted thrust pad, the figure being as regards its left-hand half a plan view showing the backing, and as regards its right-hand half a similar view with the backing removed to show the plugs;

Figure 6 being a section on the line C—C of Figure 5.

Figure 7:
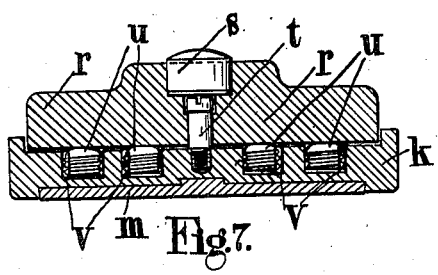

Figure 7 is a section of a thrust pad similar to Figure 6, but showing the application of compensating screw-pads instead of conical plugs.

Fig. 7$^a$ is an enlarged detail of the element and support of Fig. 7.

Figure 8 is a detail view in section of a form of screw plug having an interrupted thread, Figure 8$^a$ being a corresponding plan view of the plug in place in the thrust pad, and Figure 8$^b$ a cross section through the plug itself.

Figure 9 is a detail view of a modification in which the screwed plug instead of resting directly against the backing as shown in Figure 7, is screwed into an intermediate brass plate.

Figure 10 is a detail view showing the principle exemplified in Figure 9 applied to the case of a double-conical plug. Finally Figure 11 shows a view, in section as regards its upper half and in side elevation as regards its lower half, of a cross head fitted with compensating conical plugs.

Figure 11:
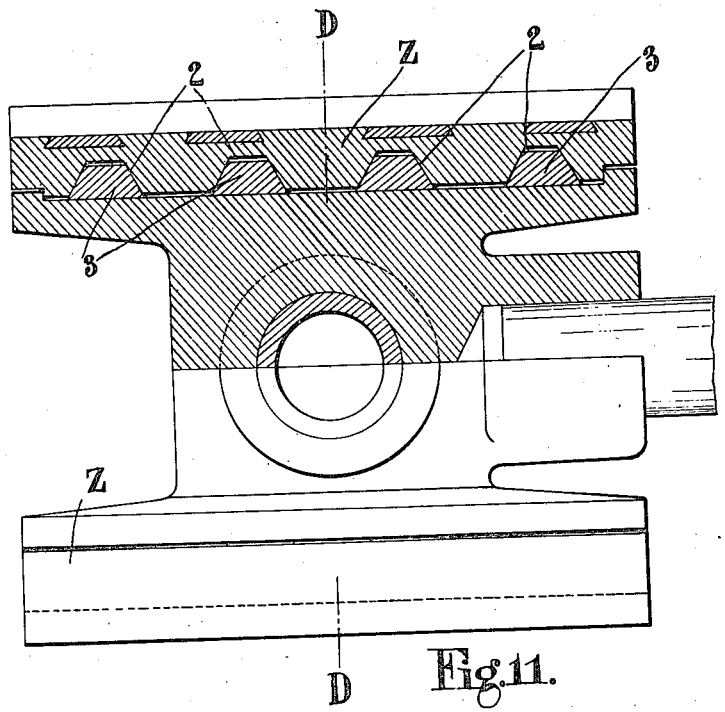

Figure 12 being a cross-section on the line D—D of Figure 11, and

Figure 13:
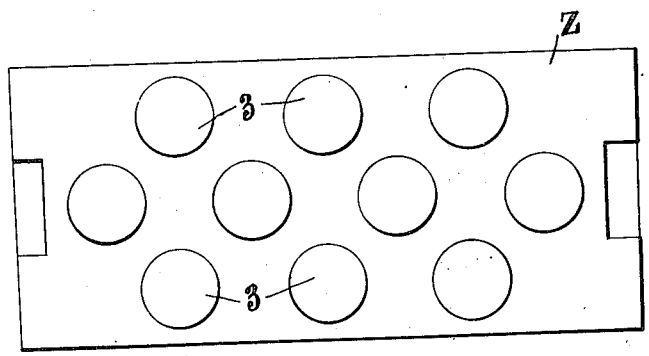

Figure 13 a plan view of one of the slippers.

Where desirable, the same reference symbols have been used to denote the corresponding parts of different types of bearings.

Figure 1:
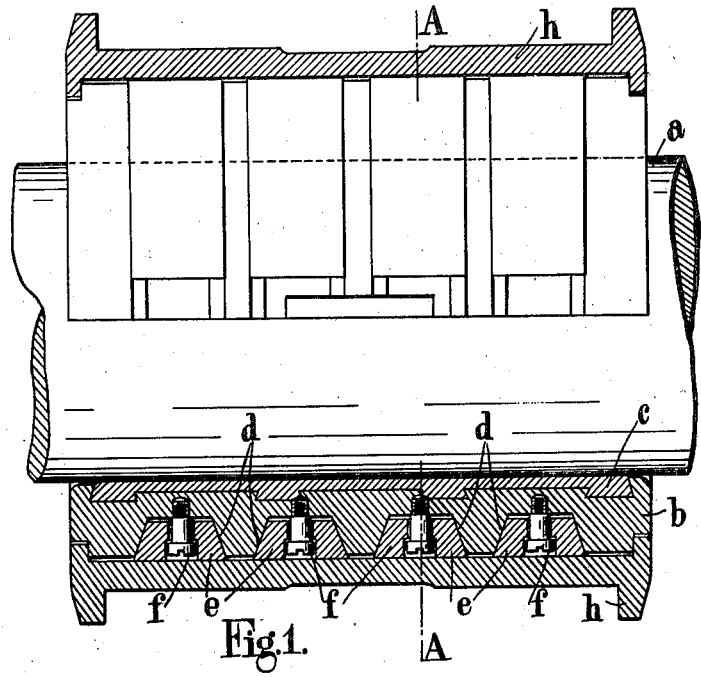
Figure 1 shows a view of a cylindrical bearing provided with compensating segmental strips, the figure being as regards its upper half an elevation with the backing in section and as regards its lower half a longitudinal section.
Figure 2:
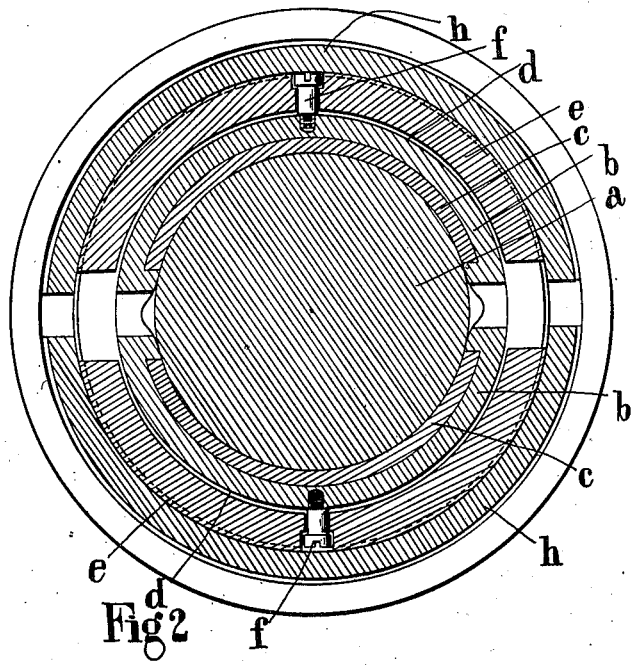
Figure 2 is a cross-section taken on the line A—A of Figure 1.

In carrying the invention into effect according to one form as applied to a bearing for a cylindrical shaft, $a$, (see Figures 1 and 2) a brass bush, $b$, lined with white metal $c$, has formed in it a number of circumferential grooves with tapered sides, $d$, in which are arranged a series of steel segments, $e$. Each such segment has been shown extending over something less than half the circumference of the circle, but may preferably be made in short strips separated by small gaps. The segments, $e$, whether long or short, may be held in the bush by screw pins, $f$, passing through them, and are surrounded by a backing, $h$, of suitable material.

If local heating occurs in such a bearing, the bush, $b$, will expand more than the segments, $e$, and the latter will therefore sink more deeply into the grooves, $d$, maintaining constant the over-all dimensions of the combined white metal, bush and segments, and therefore preventing seizing of the shaft.

In Figures 3 and 4 a modification of the above bearing is shown, in which instead of the grooves, $d$, a number of conical holes, $i$, are formed in the brass bush and in each of these a conical steel plug, $g$, is inserted held loosely in position by screws, $f$, as above.

In Figure 4$^a$, a modified form of plug, $g'$, is shown, the bearing surface of each of which takes the form of a series of stepped conical surfaces, $j'$, arranged co-axially and with a common apex. The "treads", $j^2$, of the steps also take the form of conical surfaces, but reversely disposed and have an appropriate clearance as shown.

In Figure 4$^b$, another form of plug, $g^2$, is shown, in which the conical surfaces, $j^3$, are similar to those last described but the "treads", $j^4$, with the proper clearance take the form of plane surfaces.

Finally, in the form of plug, $g^3$, shown in Figure 4$^c$, only two conical bearing surfaces, $j^5$, and $j^6$, are shown arranged one within the other at about the same mean distance from the axis of the shaft, $a$, an annular projection, $j^7$, from the bush, $b$, coacting on its interior surface with the surface, $j^5$, and having a clearance as regards its outer surface.

In all the last three modifications described the outer surface, $j^8$, of each plug is shown as spherical with a radius preferably slightly less than that of the bore of the cylindrical backing, the screws, $f$, being dispensed with. If desired the outer surface of the plugs, $g$, in Figure 3 may be modified in like manner and the corresponding screws also dispensed with.

Passing now to Figures 5 and 6, the invention is shown applied to the pad of a thrust block, the actual pad of brass being shown at $k$, faced with white metal, $m$, and provided on its rear face with a number of conical holes, $n$, in each of which is inserted a steel plug, $o$. These plugs, $o$, bear on a backing, $r$, provided with a hardened steel centre, $s$, to allow the pad to tilt in a well-known manner, the pad proper and its backing being held loosely together by the screw pin, $t$. In this modification, in a manner similar to the case of the cylindrical bearing, rise of temperature will cause the brass pad, $k$, to expand more than the steel plugs, $o$, which will therefore enter more deeply into the sockets in the pad and maintain substantially constant the over-all dimensions in a direction at right angles to the working face.

In Figure 7 is shown another form of the invention in which instead of conical plugs a number of screwed steel plugs, $u$, are inserted in the corresponding internally-threaded holes in the brass pad, $k$. The uneven expansion of the pad $k$ and plugs $u$ has the effect of causing the former which has the greater expansion to approach the end of the plug thereby producing the effect of the plug sinking into the recesses. There is no actual bodily movement of the plug in relation to the pad as is true in the modifications which show the plug as having smooth surfaces. It is merely a matter of metal expansion. When the pad $k$ cools, a contraction will follow and this member will pull away from the plugs, with the apparent result that the plugs have been partially withdrawn from the recesses. A key, $v$, is fitted to prevent the plug turning.

Fig. 7$^a$ is an enlarged view of the right-hand half of the device shown in Fig. 7. From this it will be clear that the plugs $u$ rest on the backing $r$. The plugs $u$ are preferably somewhat smaller in diameter than the recesses so that there is a clearance between the male and female threads. In any case, however, the plugs become slack as the pad $k$ expands.

It will be seen that the force pressing the pad $k$ towards the backing $r$ causes the female threads in the latter to rest on only one side of the male thread of the plugs u, so that they behave practically in the same manner as the simple conical surfaces shown in the other forms, that is to say, that with an increases in diameter of the socket relative to the plug, the latter sinks into the former or with the latter stationary, the socket slides further over the plug. It will be clear that the only difference between the screwed form and the simple cones is that in the former the conical surface is distorted into a spiral.

Looking at the matter from a slightly different angle, the spiral surface is substantially the same in action as though it were replaced by a number of simple conical surfaces one below the other.

If the plug were of considerable length, longitudinal expansion would cause it to ride on the threads nearest the backing r when heated above the normal and contraction would cause it to rest on the threads farthest from the backing r if cooled below the normal temperature. With a short thread, however, of the kind shown in Fig. 7$^a$, the effect of longitudinal expansion is small and a good compromise is obtained with a very simple construction.

In Figures 8, 8$^a$ and 8$^b$, a modification is shown in which the threaded plug, w, has formed in it a number of longitudinal grooves, x, after the manner of the interrupted thread of a breach block, the internal threads of the holes receiving the plugs being correspondingly formed. In this form of the invention, the key, v', may take an arcuate form to correspond with the longitudinal interruption in the threads.

If greater compensation is desired, instead of the steel plug resting directly against the shrouding or backing, r, as in Figure 7, it may be lengthened as shown in Figure 9 and screwed into another brass plate, k', which in turn rests against the shrouding, thus giving twice the amount of give with the same form of screw thread. In this form, also, a key, v, should be fitted to prevent the plug turning in its hole.

In Figure 10 a corresponding modification of the conical plug type is shown, in which the plug, o', has the form of two truncated cones base to base and is arranged in corresponding sockets in the plates, k'.

Finally, in Figures 11, 12 and 13, the invention is shown applied to a cross-head, the slippers, z, of which have formed in them a number of conical holes, 2, in each of which is arranged a steel plug, 3, acting with variations of temperature in the manner described above in relation to other forms of the invention.

Owing to the manner in which the bearing is supported on a large number of such compensating elements acting as pillars, the alignment of the whole surface is approximately maintained in spite of local variations in pressure and temperature.

Moreover, if desired, with such arrangements the actual height of the working surface relatively to the shrouding of the bearing may be maintained constant.

In all forms of the present invention "invar" may be used if desired instead of steel, thereby more than doubling the amount of compensation.

Examples of certain bearings having substantially the same object are described in the provisional specification accompanying our application for British Patent No. 25235 of 1920, and the present invention may be modified in any of the ways therein set forth; in particular, instead of metals having different co-efficients of expansion, the same or different metals having the same rate of expansion may be utilized, unequal heating being relied on to provide the necessary differential expansion.

Moreover, it will be evident that the contours of the bearing surface may be plane, cylindrical, conical or curved, and details of construction may take a great variety of different forms without departing from the nature of the invention above described.

Having now described our invention, what we claim as new and desire to secure by Letters Patent is:—

1. A compensating bearing comprising in combination a common supporting member having a plurality of sockets defined by outwardly diverging surfaces and a plurality of load carrying plug members with corresponding converging surfaces disposed one each in the sockets of said common supporting member, said common supporting member and said plug members being differentially expansible, so that if local overheating occurs the plug member or members concerned enters a certain distance into its socket thus transferring its load into the remaining plug member or members, as set forth.

2. A compensating bearing comprising in combination a common supporting member having a plurality of sockets defined by outwardly diverging surfaces and a plurality of load carrying plug members with corresponding converging surfaces disposed one each in the sockets of said common supporting member, said common supporting member having a greater coefficient of expansion than said plug members, so that if local overheating occurs the plug member or members concerned enters a certain distance into its socket thus transferring its load to the remaining plug member or members, as set forth.

In testimony whereof we have signed our names to this specification.

CHARLES ALGERNON PARSONS.
STANLEY SMITH COOK.